3,381,681
RECEPTACLE FOR FROZEN FOOD
Jiro Nagashima, New York, N.Y. (753 Kamitaga, Atomishi, Japan), and Akira Aoki, New York, N.Y. (230 Ida, Kawasaki-shi, Japan)
Filed June 1, 1965, Ser. No. 460,268
Claims priority, application Japan, May 13, 1965, 40/27,604, 40/27,605
4 Claims. (Cl. 126—369)

ABSTRACT OF THE DISCLOSURE

A receptacle for steam cooking food therein and in which the interior is compartmented by upwardly extending portions of the receptacle bottom forming portions which define the compartments. The compartments are spaced so that two paired upwardly extending portions defining the compartments are spaced and define exteriorly of the receptacle a space therebetween which closes at the top of the outside space and is provided with apertures at the top. The partitions or walls terminate within the receptacle at levels below a removable cover on the receptacle and thus are spaced from the inner side of the cover. Steam for cooking food contained in the receptacle enters the container through the above-mentioned apertures and the space between the cover and the compartment-forming walls allows the steam to enter the interior of all the compartments for cooking the food therein. Through holes are provided in the cover for allowing ingress and egress of steam.

---

The present invention relates to a receptacle for frozen foods, particularly providing a receptacle for frozen foods for cooking by steam.

For some time it has been possible to buy, in many markets, so-called "frozen foods" which can be cooked very easily at home in an oven or in a pan which contains boiling water. The so-called frozen foods are considered to be epoch-making in the developed countries. However, experience has shown troubles while cooking such foods; the food can burn while cooking it in the oven, the boiling water which is in the receptacle can flow over, the cover of the pot can start to drip or the water in which the food is dipped can completely evaporate. Moreover, there is need for an oven for quick cooking. Therefore it is said that the above mentioned troubles have prevented the spread of use of frozen foods.

A principal object of the present invention is to provide a receptacle for frozen food to be cooked by steam, in a very easy way and very quickly.

Another object of the present invention is to provide a cooking method for frozen food, which can keep its good taste similarly to fresh cooked food, in a minimum of time.

The foregoing and other objects and advantages of the invention will become apparent from the following description of a preferred embodiment thereof as illustrated in the accompanying drawings forming a part hereof in which.

Figure 1:
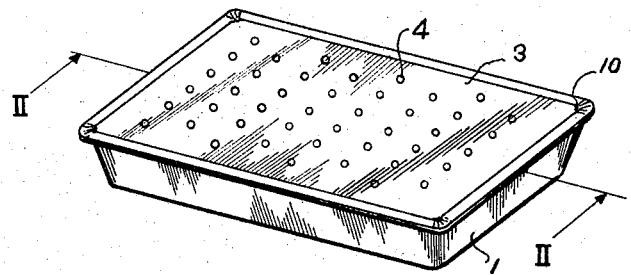
FIG. 1 is a perspective view of a receptacle of a complete receptacle according to the present invention.
Figure 2:
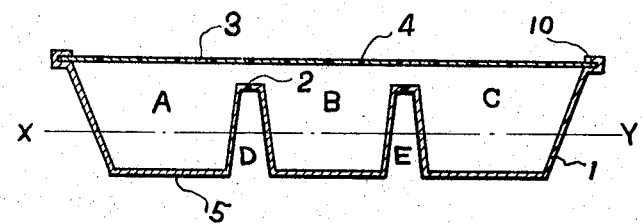
FIG. 2 is a cross-sectional view taken along line II—II of the receptacle of FIG. 1.

As shown in FIGS. 1 and 2, a receptacle 1 and a cover 3 are made of heat-proof material such as aluminum or heatproof-plastic material. The cover 3 is provided with a suitable number of small holes 4 disposed as shown in the drawing at FIG. 2. The receptacle 1 is divided into three divided receptacles A, B and C, and there are two upwardly projected walls 2 having a suitable number of small holes 28 disposed on top of the walls 2. The receptacle 1 has flange portions 10 disposed at each top end of the side walls and the removal cover plate 3 is secured by the flange 10. The receptacle 1 has two upwardly projected spaces D and E widening in a downward direction as shown in the drawing.

In packing the receptacle the food is put in the small compartments A, B and C and then covered by the cover plate 3 secured by the flange portion 10 of the receptacle 1. In case a thick aluminum foil is used, which is usually used for receptacles for packing frozen food, it is very easy to secure the cover plate 3 by the flange portion 10. After packing, a receptacle 1 is subjected to the freezing process and the foods therein are frozen. Any kind of freezing method may be used for the present invention.

For cooking at home, two different methods are suggested, i.e., the first is cooking by steam, the second one is cooking by steam generated by boiling water which is disposed at the bottom of a pan while the receptable is in the pan.

In FIG. 2, as line X–Y shows the level of the boiling water which is used in a pan, when cooking by means of a pan. In this case, the steam generated inside the pan enters the receptacle through holes 2 and 4 and then directly heats the surface of the frozen food inside the receptacle 1. It is very easy to understand that the frozen food is heated by the steam, therefore there is no evaporation of water or juice which is in the frozen foods and, moreover, the frozen foods are also heated through the side walls of the receptacle 1. So it is possible to cook the food in a minimum time for example ten minutes. As shown by the above mentioned description, this cooking method has a lot of advantages compared with conventional method, i.e., the cooking or baking in an oven etc. There is no change of taste, and there is no possibility the food might burn. There is a possibility of cooking in a very short time, and of cooking without need of an oven etc.

Figure 3:
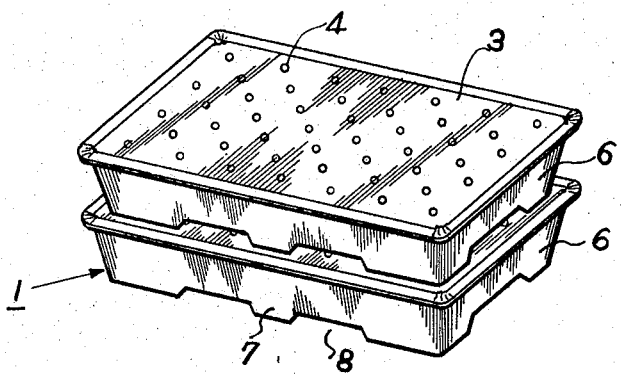
FIG. 3 is a perspective view of several receptacles placed one on the other.

FIG. 3 shows another embodiment of the present invention. In FIG. 3, a receptacle 1 is formed by side walls 6 and 7 extending downwards from a bottom plate 5 of the receptacle 1, and a suitable number of recesses 8 are disposed at the edge portion of the extended side walls 6 and 7. The other constructions of the receptacle 1 are the same as those of the first embodiment of the present invention. The main purpose of the additional side walls 6 and 7 is to provide paths for steam to the spaces existing under the bottom 5 of the receptacle while cooking by steam, especially in cooking for a big family. For the same purpose, an other kind of construction can be applied, for instance, several legs can extend downwardly which provide several steam paths. FIG. 3 shows a cooking method by steam for a big family, that is, several receptacles containing food are disposed, for example in a steam cooker not shown, one over the other as shown in the drawing at FIG. 3. Therefore, the steam passes and comes into the receptacles through the holes 2 and 3 of each receptacle and the frozen food contained in each receptacle is heated by the side walls of each receptacle.

As described above, the receptacle according to the present invention has many advantages compared with the conventional receptacle which is used for frozen foods and moreover, several kinds of material such as metallic foil, heatproof plastic material, etc. can be used. It will be understood that the different features of the embodiment illustrated in the drawings and described above, are interchangeable in so far as they are mutually compatible and that an other modification may be made without deviating from the spirit of the invention as defined in the appended claims.

What is claimed is:

1. A receptacle having a cover for frozen food comprising small compartments disposed inside of said receptacle, upwardly projecting walls disposed between the ends and sides of said receptacle defining said small compartments, said walls having inverted substantially V-shaped and U-shaped vertical cross sections and having plural small holes disposed at the top of said walls so as to pass steam into said receptacle, said cover having a plurality of small holes for passing steam into said receptacle while cooking frozen food therein in steam.

2. A receptacle having a cover for frozen food, comprising a plurality of small compartments disposed inside of said receptacle, upwardly projected walls disposed between said small compartments, downwards elongated extended outside walls extending downwardly from the bottom of said receptacle, said walls having inverted V or U shaped cross-section and a top surface disposed under said cover so as to provide a small space interval existing between said cover and said top surface, and provided with small holes disposed at said top surface of walls, said cover having a plurality of small holes, said outside walls having recesses opened downwards at an edge portion thereof, whereby steam passes through said small holes of said cover into said receptacle, and steam enters into a space existing under said bottom of the receptacle through said recesses and passes through said holes of said walls into said receptacle while cooking frozen food in steam.

3. A receptacle having a cover for frozen food comprising a plurality of small compartments disposed inside of said receptacle, upwardly projected walls disposed defining said small compartments, downwards projected legs disposed projecting downwardly at said bottom of said receptacle, said walls having inverted V or U shaped vertical cross-section and top surfaces disposed under said cover so as to provide little space intervals existing between said cover and each of the top surfaces, and provided with plural small holes disposed at said top surface of said walls, said cover having a plurality of small holes, whereby steam passes through said small holes of said cover into said receptacle and steam enters into the space existing under said bottom of said receptacle through spaces between said legs and passes through said holes of wall into said receptacle while cooking frozen food in steam.

4. A receptacle for steam cooking food therein comprising, a cover for said receptacle, means defining small compartments holding food therein during steam cooking thereof, said means comprising a bottom and upwardly extending walls spaced from each other separating said compartments and comprising pairs of walls in the interior of said receptacle spaced laterally from each other defining next adjacent compartments, each of said pairs of walls defining a space exteriorly of said receptacle extending upwardly from said bottom toward said cover and terminating interiorly of said receptacle below said cover, means joining the tops of walls of respective pairs below the interior level of said cover comprising through holes therein to allow entry of steam into said compartments for cooking food therein, and said cover having a plurality of through holes therein to allow ingress and egress of steam.

References Cited

UNITED STATES PATENTS

| | | | |
|---|---|---|---|
| 956,802 | 5/1910 | Fox | 126—369 |
| 2,633,284 | 3/1953 | Moffett et al. | 206—46 |
| 2,674,536 | 4/1954 | Fisher | 229—3.5 |
| 2,850,391 | 9/1958 | Gunsberg | 206—36 |
| 2,967,023 | 1/1961 | Huckabee | 239—60 |
| 2,969,292 | 1/1961 | Heller | 239—3.5 X |
| 3,040,735 | 6/1962 | Lyon | 126—376 |
| 3,141,455 | 7/1964 | Dumbeck | 126—369 |
| 3,256,806 | 6/1966 | Jordan | 229—3 |

KENNETH W. SPRAGUE, *Primary Examiner.*

ROBERT A. DUA, *Examiner.*